(12) United States Patent
VanDyk et al.

(10) Patent No.: US 9,486,942 B1
(45) Date of Patent: Nov. 8, 2016

(54) MOLD INTERLOCKS

(71) Applicant: Stampede Die Corporation, Wayland, MI (US)

(72) Inventors: Lee A. VanDyk, Byron Center, MI (US); Randall T. Kerkstra, Hudsonville, MI (US)

(73) Assignee: Stampede Die Corp., Wayland, MI (US)

( * ) Notice: Subject to any disclaimer, the term of this patent is extended or adjusted under 35 U.S.C. 154(b) by 229 days.

(21) Appl. No.: 14/224,874

(22) Filed: Mar. 25, 2014

Related U.S. Application Data

(60) Provisional application No. 61/804,959, filed on Mar. 25, 2013.

(51) Int. Cl.
*B29C 33/30* (2006.01)
*B29C 45/26* (2006.01)

(52) U.S. Cl.
CPC ......... *B29C 33/303* (2013.01); *B29C 45/2606* (2013.01)

(58) Field of Classification Search
CPC ... B29C 33/30; B29C 33/303; B29C 33/304; B29C 45/2606; B29C 45/36
See application file for complete search history.

(56) References Cited

U.S. PATENT DOCUMENTS

| | | | | |
|---|---|---|---|---|
| 3,081,494 A | * | 3/1963 | Darnell | B29C 45/2606 249/160 |
| 3,379,239 A | * | 4/1968 | Rusk | B22C 7/06 164/387 |
| 3,776,299 A | * | 12/1973 | Rusk | B22C 21/10 164/385 |
| 4,199,313 A | * | 4/1980 | Bohnenberger | B22D 17/22 164/385 |
| 4,561,626 A | * | 12/1985 | Black | B29C 33/202 249/118 |
| 5,332,384 A | * | 7/1994 | Abramat | B29C 33/303 249/141 |
| 5,494,435 A | * | 2/1996 | Vandenberg | B29C 45/2602 425/450.1 |
| 5,776,518 A | * | 7/1998 | Wohlgemuth | B29C 33/303 249/158 |
| 5,788,903 A | * | 8/1998 | Allgaier | B29C 33/303 264/219 |
| 6,431,852 B1 | * | 8/2002 | Vandenberg | B29C 45/2602 425/450.1 |
| 7,381,041 B2 | * | 6/2008 | Wilber | B29C 33/44 425/116 |
| 7,581,939 B1 | * | 9/2009 | Finkel | B29C 33/303 164/342 |

OTHER PUBLICATIONS

Excerpt of DME catalog disclosing brand pins and bushings available more than one year prior to Mar. 25, 2013.
PCS Company brochure disclosing Tapered Interlocks Round available more than one year prior to Mar. 25, 2013.

* cited by examiner

*Primary Examiner* — James MacKey
(74) *Attorney, Agent, or Firm* — Gardner, Linn, Burkhart & Flory, LLP (57) ABSTRACT

A mold bushing assembly includes a pin member for assembly to a first mold portion and a bushing member for assembly to a second mold portion. The pin member includes a projection that includes a land portion and a guide portion, with the land portion being cylindrical and having an axial length, and with the guide portion extending from the land portion and having a varying cross sectional diameter that decreases from the land portion. The bushing member includes a bushing cavity into which the projection at least partially extends when the first and second mold portions are engaged with at least a portion of the land portion extending into the bushing cavity to aid in accurate alignment of the mold portions.

19 Claims, 6 Drawing Sheets

SECTION A-A

SECTION B-B

MOLD INTERLOCKS

CROSS REFERENCE TO RELATED APPLICATION

The present application claims priority of U.S. provisional application Ser. No. 61/804,959 filed Mar. 25, 2013, which is hereby incorporated herein by reference in its entirety.

BACKGROUND OF THE INVENTION

The present invention is directed to a mold interlock or bushing assembly for aligning mold members, and in particular for aligning two adjoining mold members that are selectively engaged and disengaged from each other.

Numerous different types and styles of parts and components are molded in various industries, including seat and arm rests for office chairs and vehicle interiors, for example. Misalignment between two mold portions when engaging with each other can result in the creation of flashing at parting lines that may result in the part being scraped, or requiring rework. In addition, buildup of wax applied to mold portions to facilitate release of molded parts, as well as wear of the molds, may exacerbate such misalignment problems.

SUMMARY OF THE INVENTION

The present invention provides a mold interlock assembly or bushing assembly that aids in accurately aligning and guiding mold portions into engagement for promoting molding accuracy.

According to an aspect of the present invention, a mold interlock or bushing assembly includes a pin member for assembly to a first mold portion and a bushing member for assembly to a second mold portion. The pin member includes a projection that includes a land portion and a guide portion, with the land portion being cylindrical and having an axial length, and with the guide portion extending from the land portion and having a varying cross sectional diameter that decreases from the land portion. The bushing member includes a bushing cavity into which the projection at least partially extends when the first and second mold portions are engaged with at least a portion of the land portion extending into the bushing cavity. In a preferred embodiment the guide portion includes a spherical radius.

The pin member further includes a cylindrical body portion that is axially aligned with the land portion and has a diameter greater than the land portion such that a shoulder is positioned at or between the body portion and the projection. The pin member may further include an axial through bore through which a fastener is passed for securing the pin member to the mold portion. The through bore may further include a threaded portion for aiding in removal of the pin member from the mold portion. Still further, the pin member may include one or more elongate channels for channeling wax and other debris build up away from the mating of the pin member and bushing member.

The bushing cavity is cylindrical at the location into which the land portion of the pin member extends or engages. Moreover, the bushing member may be cylindrical and include a bottom wall having a through bore through which a fastener is passed for securing the bushing member to the mold portion. The through bore may further include a threaded portion for aiding in removal of the bushing member from the mold portion.

The pin member and bushing member are installed into cavities located on the front face of the respective mold portions, thereby aiding installation and removal of the bushing assembly, and more than one such bushing assembly may be used with a mold. When installed, at least a portion of the land portion extends beyond the cavity into which the pin member is installed relative to the mold parting line for engagement with the cavity of the bushing member. The bushing member and/or the shoulder of the pin member may be recessed relative to a parting line defined by the mold.

The mold interlock or bushing assembly of the present invention enables mold portions to be accurately guided and aligned into engagement for molding parts to thereby promote the molding of parts to avoid scrap and rework. Moreover, the bushing assembly components are readily installed from the front faces of the mold portions, thereby greatly easing installation and removal. Still further, the construction of the bushing assembly, including the elongate land portion and guide portion of the pin member which extend into the bushing cavity provide guiding alignment without requiring exacting tolerances to be held during installation into cavities on the mold, and enable the mold portions to be re-worked if required.

These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures. As understood from FIG. 1, mold 20 represents a conventional mold that includes a first or upper mold portion or half 22 and a second or bottom mold portion or half 24, where portions 22, 24 include cavities 26, 28 formed therein, respectively, to form molded parts. Portions 22, 24 are selectively engaged such that a material placed in or injected into the combined cavity formed by cavities 26, 28 may be molded into a desired pattern as defined by the cavities 26, 28. Portions 22, 24 are intended to engage and disengage from each other at a parting line 30 (FIG. 2) defined by the engagement of a face surface 32 of portion 22 engaging with a face surface 34 of portion 24.

As understood from FIG. 2 and discussed in more detail below, mold interlock or bushing assembly 40 promotes and aids in the accurate alignment and engagement of mold portions 22, 24 with one another when moved into a closed position for molding parts. This accurate alignment and engagement of the mold portions 22, 24 aids in inhibiting flashing and/or misalignment of the molds which would otherwise result in the creation of scrap or require additional manufacturing steps to be performed on the molded part.

Figure 2:
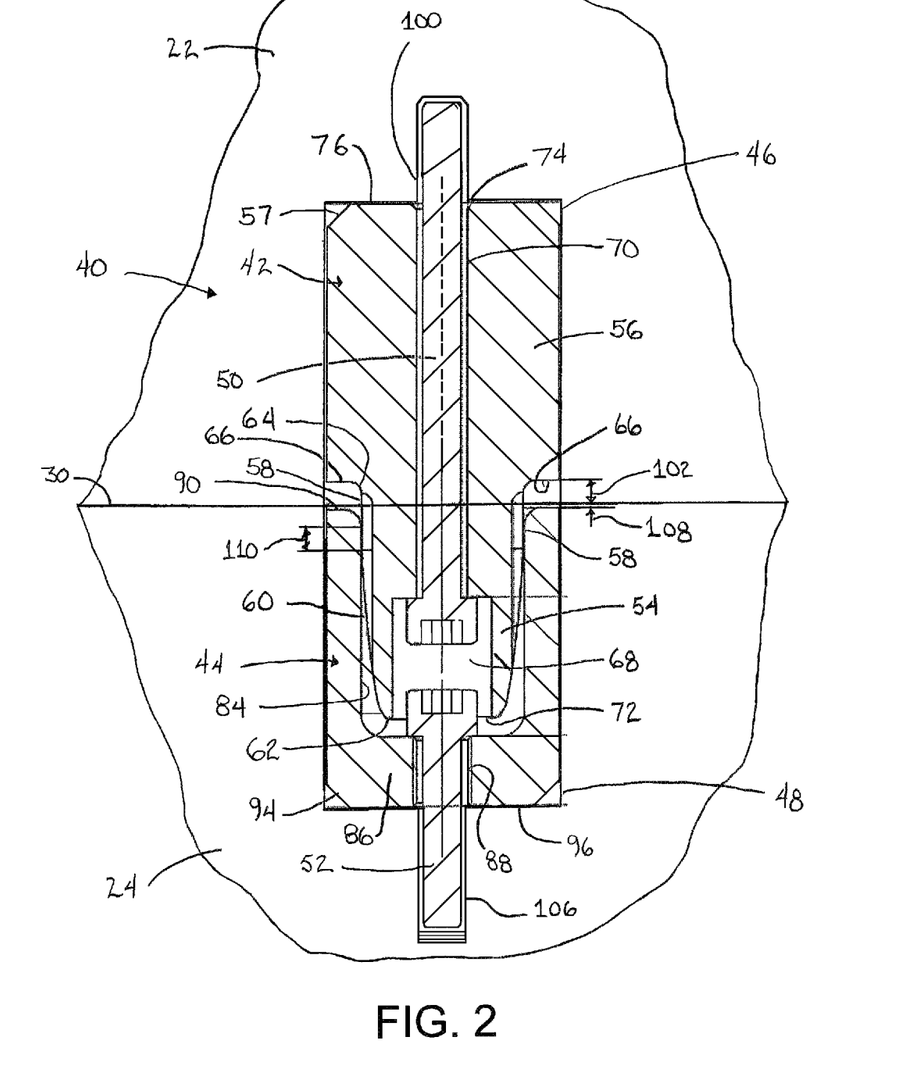
FIG. 2 is a cross sectional view of a portion of the mold of FIG. 1 in a closed orientation showing a single bushing assembly in accordance with the invention with the upper and lower mold portions engaged and aligned by the bushing assembly.
Figure 3:
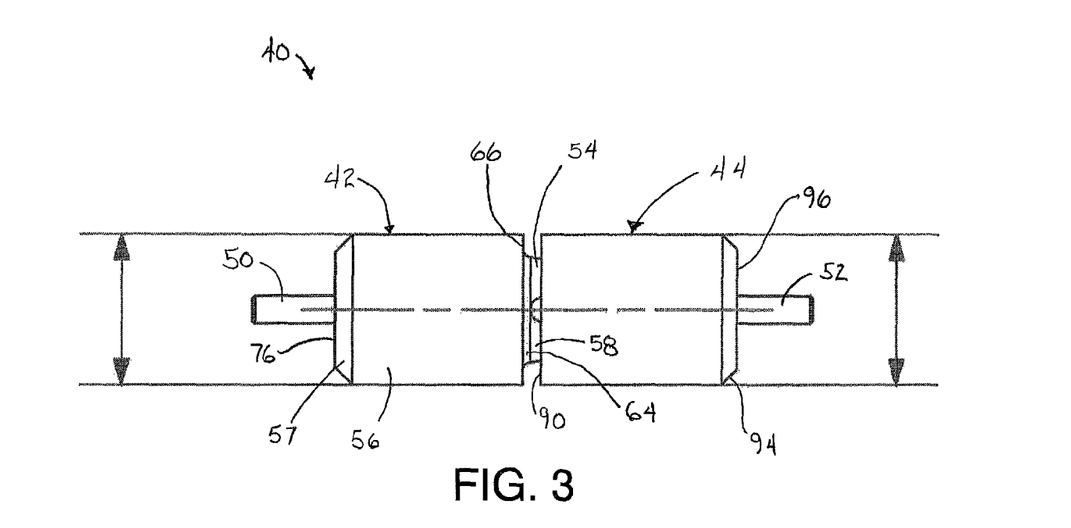
FIG. 3 is a side elevation view of the bushing assembly of FIG. 2 removed from the mold.
Figure 4:
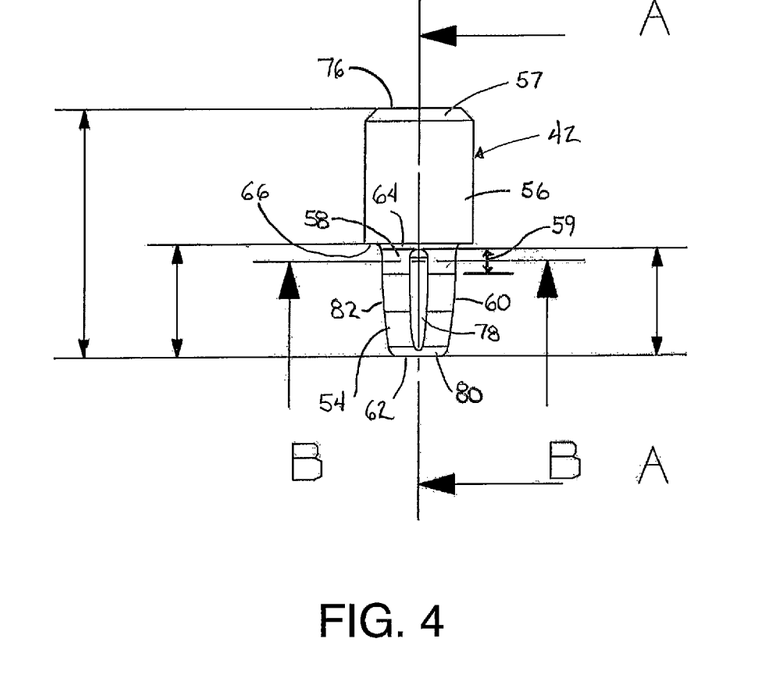
FIG. 4 is a side elevation view of the pin portion of the bushing assembly of FIG. 3.
Figure 5:
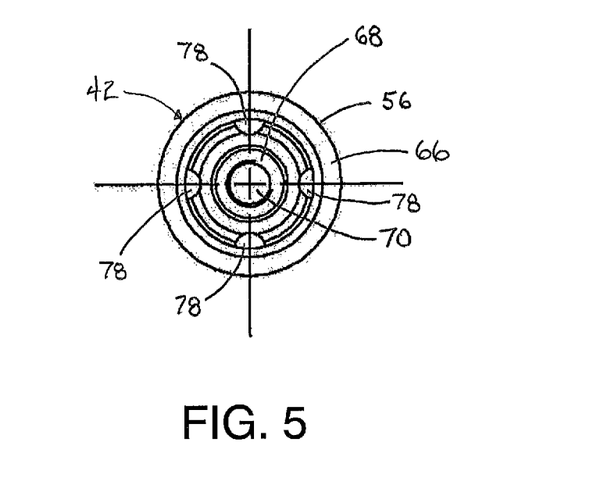
FIG. 5 is a top plan view of the pin portion of the bushing assembly of FIG. 4.
Figure 6:
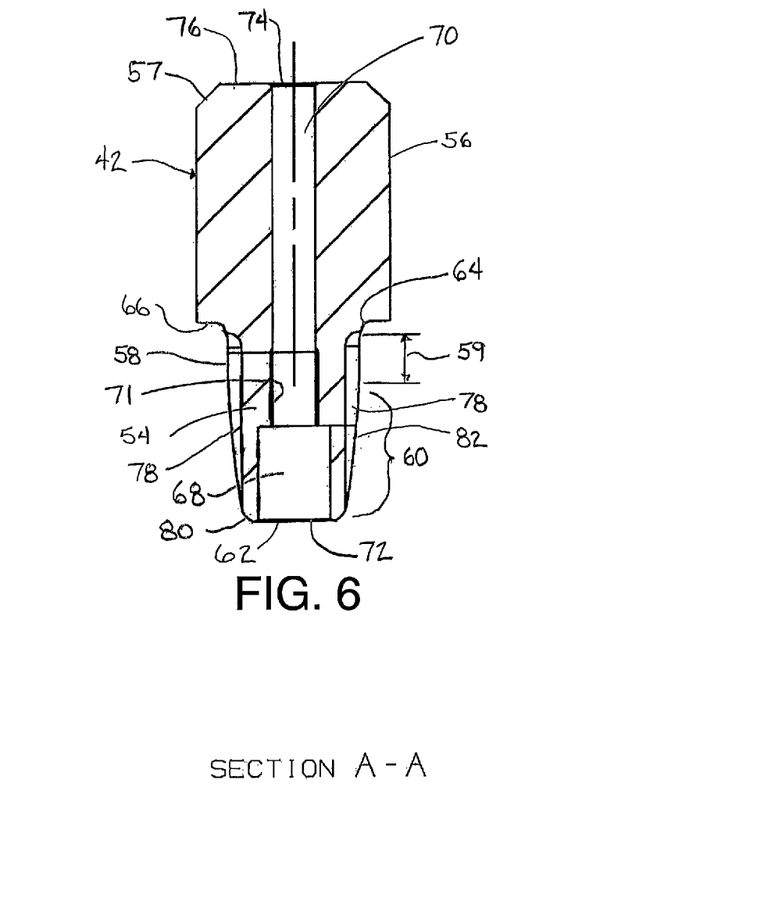
FIG. 6 is a cross sectional view of the pin portion of the bushing assembly of FIG. 4 taken along the line A-A.
Figure 7:
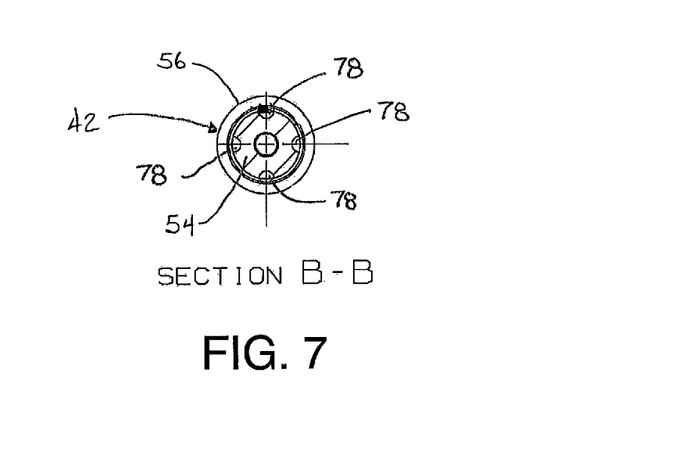
FIG. 7 is a cross sectional view of the pin portion of the bushing assembly of FIG. 4 taken along the line B-B.

Bushing assembly 40 includes a first portion or pin member 42 and a second portion or bushing member 44, which mateingly engage with one another when mold portions 22, 24 are placed in a closed orientation or position as shown in FIG. 2. In the embodiment shown, pin member 42 is installed within a cavity 46 formed in mold portion 22 and bushing member 44 is installed within a cavity 48 of mold portion 24. In particular, pin member 42 is installed from the face 32 of mold portion 22 by way of a fastener, such as bolt 50, and bushing member 44 is installed from the face 34 of mold portion 24 by way of a fastener, such as bolt 52. The installation of pin member 42 and bushing member 44 from faces 32, 34, respectively, significantly simplifies the installation difficulty and time with respect to conventional mold interlock arrangements. Moreover, pin member 42 and bushing member 44 engage with one another when mold portions 22, 24 are closed to aid in the aligned engagement of mold portions 22 and 24 together.

Pin member 42 will now be discussed in more detail with reference to FIGS. 4-7. Pin member 42 includes a projection or projecting portion 54 and a body portion 56. Body portion 56 comprises a cylindrical member that is installed within cavity 46, and includes a chamfer 57 at a bottom end for clearance purposes when installed within cavity 46. Projection 54 in turn includes a land portion 58 and a guide portion 60, where land 58 and guide 60 are connected at one end of guide portion 60 and the opposite end of guide portion 60 defines an end or tip 62 of pin member 42. Land portion 58 is connected to or located adjacent to body 56 via a radius or radiused chamfer 64. Moreover, land 58 comprises a cylindrical member having a constant diameter over an axial length 59, where the diameter of land 58 is smaller than and coaxially aligned with body 56 such that a shoulder 66 is formed on pin member 42. Pin member 42 further includes a through hole extending there through comprising a cavity 68 and a through bore 70 (FIG. 6), where cavity 68 is formed in portion 60 to form an opening 72 in end 62 and bore 70 forms an opening 74 at an opposite end 76 of pin member 42. In addition, through bore 70 includes a threaded portion 71 (FIG. 6) located at the top of bore 70 adjacent cavity 68, where threaded portion 71 does not extend the entire length of bore 70. Projection 54 also includes multiple axially extending elongate slots or channels 78 extending over both land portion 58 and spherical radius portion 60.

In the illustrated embodiment guide portion 60 includes a spherical radiused portion. In particular, in the illustrated embodiment, guide portion 60 is formed with a first radius 80 at tip 62 and a second radius 82 extending from tip 62 to land 58. As discussed in more detail below, guide portion 60 promotes initial engagement with bushing member 44 to enable initial alignment there between, and corresponding alignment between mold portions 22 and 24, with land portion 58 subsequently engaging with bushing member 44 upon further closing of mold 20 to provide more accurately aligned engagement between pin member 42 and bushing member 44, and thereby aligning mold portions 22 and 24. That is, guide portion 60 accommodates some amount of misalignment between the mold portions 22, 24 when initially being closed to provide initial guiding alignment of the components together until land portion 58 engages with bushing member 44 whereby the mold portions 22, 24 are then accurately aligned upon being placed in a closed position.

Figure 8:
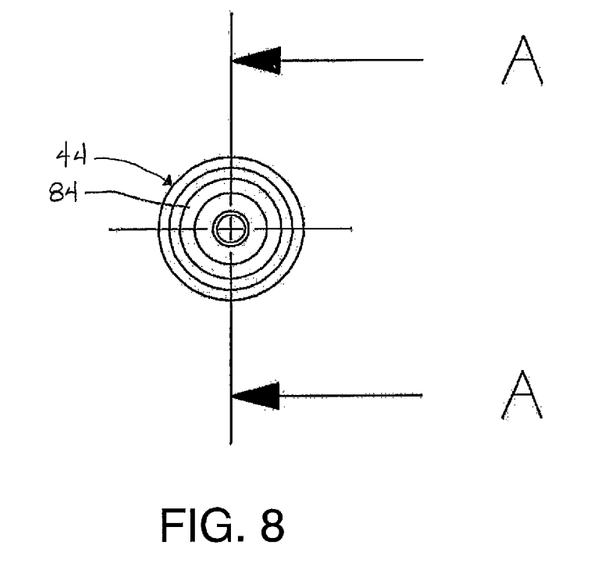
FIG. 8 is a top-plan view of the bushing portion of the bushing assembly of FIG. 3.
Figure 9:
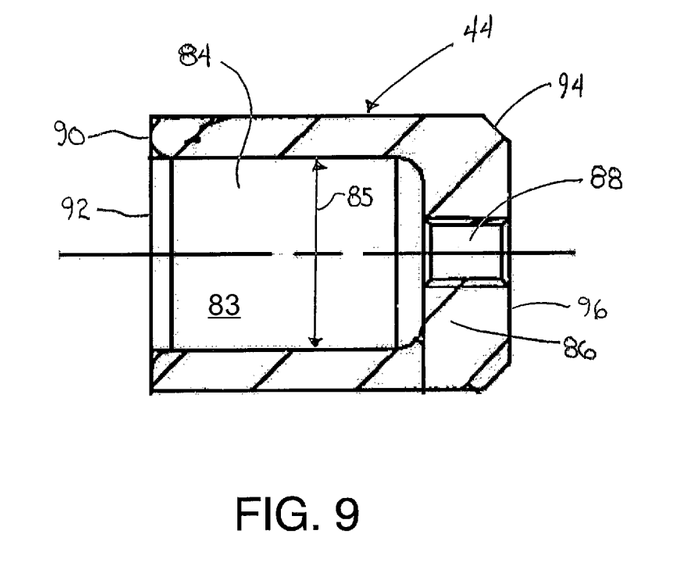
FIG. 9 is a cross sectional view of the bushing portion of the bushing assembly of FIG. 3 taken along the line A-A in FIG. 8.

Bushing member 44 will now be described in more detail with reference to FIGS. 8 and 9. Bushing member 44 is cylindrical and includes a cylindrical cavity 84, having an internal wall 83 defining an internal diameter 85 and a bottom wall 86 with a threaded through hole 88. Bushing member 44 further includes an end 90 forming a radiused edge defining an opening 92 to cavity 84. A chamfer 94 is located at an opposite end 96, where chamfer 94 aids in accommodating installation into cavity 48 of mold portion 24.

The installation of bushing assembly 40 into mold 20 will now be described with reference to FIG. 2. As shown, pin member 42 is seated into cavity 46 of mold portion 22 and retained therein by fastener 50, where fastener 50 is a socket head cap screw and does not engage with threaded portion 71 of bore 70, but rather engages with threads 100 in mold portion 22 to retain pin member 42 therein. Cavity 46 is formed to have a depth such that pin member 42 is recessed within cavity 46, and in particular shoulder 66 is recessed from parting line 30 a depth 102 via shoulder 66 being recessed below face surface 32. As shown, however, land portion 58 still extends out of cavity 46 beyond parting line 30.

Correspondingly, bushing member 44 is seated into cavity 48 of mold portion 24 and retained therein by fastener 52. Fastener 52 is a socket head cap screw and is sized such that the threads of fastener 52 do not engage with the threads on hole 88, but rather engage with threads 106 in mold portion 24 to retain busing member 44 therein. Cavity 48 is formed to have a depth such that end 90 of bushing member 44 is recessed within cavity 48 relative to parting line 30 a depth 108, with end 90 of bushing member 44 being recessed below face surface 34.

As understood from FIG. 2, when installed as above and mold portions 22, 24 are moved into a closed position, at least a portion of land 58 of pin member 42 is located within cavity 84 over an engagement length 110. Moreover, land portion 58 and diameter 85 of cavity 84 are sized to have a minimal clearance there between such that land portion 58 engages with cavity 84 whereby bushing member 44 accurately aligns mold portions 22, 24 relative to each other. It should be further appreciated that guide portion 60, such as by way of the spherical radius, accommodates initial misalignment of the mold portions 22, 24 as the portions are being closed.

Because of the length of land 58 and engagement with bushing member 44, the depths of cavities 46, 48 need not be as accurately controlled or maintained relative to parting line 30 while still enabling bushing assembly 40 to aid in providing guiding alignment of the mold portions 22, 24 together. Moreover, the recessing of pin member 42 and bushing member 44 relative to parting line 30 accommodates potential wear of surfaces 32, 34 of mold portions 22, 24 and/or allows surfaces 32, 34 to be re-ground or milled if desired without having to rework cavities 46, 48. As also understood from FIG. 2, when installed end 62 of pin member 42 is spaced from bottom wall 86.

Still further, pin member 42 and bushing member 44 may be readily removed from mold 20, and in particular from the front of mold portions 22, 24. Regarding pin member 42, for example, fastener 50 is initially removed and a larger screw is then threaded into engagement with threaded portion 71 of pin member 42. The removal fastener is then rotated to bear against another member, such as in the manner of a pulley removal tool, to pull pin member 42 from cavity 46. Likewise, fastener 52 may be removed from bushing member 44 and then a larger screw threaded into engagement with threaded hole 88 and rotated to bear against another member, as above, to pull bushing member 44 from cavity 48.

It should be appreciated that bushing assembly 40 may be provided in different materials and sizes, such as may be desired depending on a particular application. In general, the axial length of the guide portion will be in the range of approximately 2 to 2.5 times greater than the axial length of the land portion. In a first embodiment, for example, body 56 of pin member 42 and bushing member 44 have an outside diameter of approximately 0.75 inches, with pin member 42 and bushing member 44 being made of SAE 4140 grade steel and nitrite coated to a depth of 0.01 inches. Pin member 42 has a length of approximately 0.78 inches from end 62 to shoulder 66, and a length of approximately 0.74 inches from end 62 to the bottom of land 58 at radius 64, with land 58 having a diameter of approximately 0.525 inches and a length 59 of approximately 0.25 to 0.3 inches. In such an embodiment, first radius is approximately 0.09 inches and second radius is approximately 5.55 inches. When installed as shown in FIG. 2, with shoulder 66 recessed from parting line 0.065 inches and end 90 recessed from parting line 0.025 inches, there would be an engagement length 110 of approximately 0.065 inches. Moreover, diameter 85 of bushing member 44 is constructed to be approximately 0.527 inches whereby accurate alignment may be obtained when so engaged. That is, the diametrical clearance between the diameter 85 of bushing member 44 and the diameter of land 58 of pin member 42 is on the order of approximately 0.002 inches.

In an alternative embodiment, bushing assembly 40 is provided with body 56 of pin member 42 and bushing member 44 have an outside diameter of approximately 1.25 inches. Such an embodiment can include equivalent ratios of the various dimensions of the guide portion 60 to the land portion 58 relative to the above described embodiment.

In the illustrated embodiment mold 20 comprises a clam shell style mold where mold portions 22, 24 are connected by hinges or the like. Bushing assemblies 40 aid in aligning mold portions 22, 24 when placed into the closed position whereas due to wear or other inaccuracies, mold portions 22, 24 may otherwise not accurately engage, thereby resulting in improperly or poorly molded parts. Moreover, during the mold process wax may be applied to one or both of surfaces 32, 34 between operations to aid in part removal. Debris may also be generated during the molding process. Axially extending grooves 78 in projection 54 aid in preventing such debris from interfering with engagement and alignment of pin member 42 and bushing member 44 by providing a place to allow such build up to be forced out from the interfacing surfaces there between. As shown in FIG. 2, the grooves 78 extend into land 58 and the spacing of end 90 from shoulder 66 when the pin member 42 and bushing member 44 are installed provides a discharge area.

Figure 1:
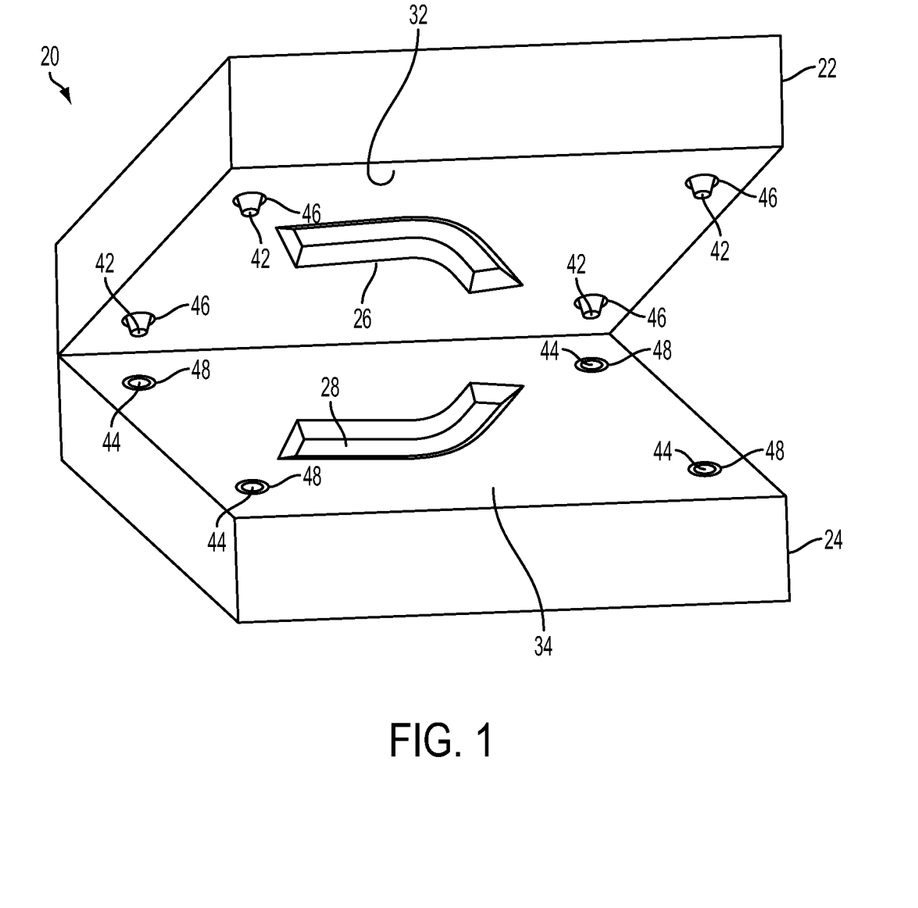
FIG. 1 is a perspective view of a mold having upper and lower mold portions disengaged in an open position, which mold may employ one or more bushing assemblies in accordance with the present invention.

Although shown in FIG. 1 as a clam shell style mold, it should be appreciated that bushing assemblies 44 may be used with other style molds as well in which mold portions or parts engage with each other. Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A bushing assembly for a mold, said bushing assembly comprising:
   a pin member for assembly to a first mold portion, said pin member having a projection that includes a land portion and a guide portion, with said land portion being cylindrical and having an axial length, and with said guide portion extending from said land portion and having a varying cross sectional diameter that decreases from said land portion; and
   a bushing member for assembly to a second mold portion, said bushing member including a bushing cavity into which said projection at least partially extends when the first and second mold portions are engaged with at least a portion of said land portion extending into said bushing cavity to engage with said bushing member, wherein said pin member includes an axially extending elongate channel disposed on an exterior surface of said pin member, said channel configured for directing debris away from the engagement of said pin member with said bushing member.

2. The bushing assembly of claim 1, wherein said guide portion includes a spherical radius.

3. The bushing assembly of claim 1, wherein said pin member further includes a body portion, said body portion having a greater cross sectional size than said land portion.

4. The bushing assembly of claim 3, wherein said body portion is cylindrical and has a greater diameter than said land portion with said land portion and said body portion being axially aligned.

5. The bushing assembly of claim 3, wherein said pin member includes a shoulder between said body portion and said projection.

6. The bushing assembly of claim 1, wherein said pin member further includes an axial through bore configured to enable said pin member to be secured to the first mold portion.

7. The bushing assembly of claim 6, wherein said through bore includes a threaded portion.

8. The bushing assembly of claim 1, wherein said bushing member has a cylindrical exterior and wherein said bushing cavity is cylindrical.

9. The bushing assembly of claim 1, wherein said bushing member includes a bottom wall with said bottom wall including a through hole configured to enable said bushing member to be secured to the second mold portion.

10. The bushing assembly of claim 9, wherein said through hole in said bottom wall is threaded.

11. A mold having first and second portions for molding one or more parts, said mold including a bushing assembly disposed in the first portion and the second portion, said mold comprising:
   a first mold portion having a first mold face surface and a first bushing assembly cavity;
   a second mold portion having a second mold face surface and a second bushing assembly cavity;
   said bushing assembly comprising a pin member and a bushing member;

said pin member being assembled into said first bushing assembly cavity, with said pin member having a projection that includes a land portion and a guide portion, with said land portion being cylindrical and having an axial length, and with said guide portion extending from said land portion and defining a varying cross sectional diameter that decreases from said land portion; and said bushing member being assembled into said second bushing assembly cavity, with said bushing member including a bushing cavity into which said projection at least partially extends when the first mold surface and the second mold surface are engaged with at least a portion of said land portion extending into said bushing cavity, wherein said pin member includes an axially extending elongate channel disposed on an exterior surface of said pin member, said channel configured for directing debris away from the engagement of said pin member with said bushing member.

12. The mold of claim 11, wherein said guide portion of said pin member includes a spherical radius.

13. The mold of claim 11, wherein said first bushing assembly cavity is disposed in said first mold face surface and said second bushing assembly cavity is disposed in said second mold face surface.

14. The mold of claim 13, wherein said pin member further includes a body portion having a greater cross sectional size than said land portion with a shoulder disposed between said body portion and said projection, and wherein when said pin member is assembled into said first bushing assembly cavity said shoulder is recessed into said first bushing assembly cavity from said first mold surface with said land portion extending outwardly beyond said first mold surface.

15. The mold of claim 14, wherein said body portion is cylindrical.

16. The mold of claim 11, wherein said first bushing assembly cavity and said second bushing assembly cavity each include a threaded hole, and wherein said pin member and said bushing member each include a through hole with said pin member and said bushing member being configured for assembly to said first mold portion and said second mold portion via threaded fasteners disposed through the respective said through holes of said pin member and said bushing member.

17. The mold of claim 11, wherein said first mold portion includes a plurality of first bushing assembly cavities and said second mold portion includes a plurality of second bushing assembly cavities, and further including a plurality of bushing assemblies for assembly into said plurality of said first bushing assembly cavities and said second bushing assembly cavities.

18. A bushing assembly for a mold, said bushing assembly comprising:

a pin member for assembly to a first mold portion, said pin member having a projection that includes a land portion and a guide portion, with said land portion being cylindrical and having an axial length, and with said guide portion extending from said land portion and having a varying cross sectional diameter that decreases from said land portion; and a bushing member for assembly to a second mold portion, said bushing member including a bushing cavity into which said projection at least partially extends when the first and second mold portions are engaged;

wherein said guide portion includes a spherical radius, and wherein said bushing cavity is cylindrical with said land portion at least partially extending into said bushing cavity when the first and second mold portions are engaged, wherein said pin member includes an axially extending elongate channel disposed on an exterior surface of said pin member, said channel configured for directing debris away from the engagement of said pin member with said bushing member.

19. The bushing assembly of claim 18, wherein said pin member further includes a cylindrical body portion having a greater diameter than said land portion with said land portion and said body portion being axially aligned, and wherein said bushing member has a cylindrical exterior.

* * * * *